United States Patent Office 2,751,365
Patented June 19, 1956

2,751,365
STABILIZED POLYCHLOROPRENE LATEX

George W. Scott, Claymont, Del., assignor to E. I. du Pont de Nemours and Company, Wilmington, Del., a corporation of Delaware No Drawing. Application February 24, 1953,
Serial No. 338,596

4 Claims. (Cl. 260—29.7)

This invention relates to an improved stabilized polychloroprene latex and to a process for removing from the polychloroprene labile chlorine which during storage tends to reduce the pH of the latex to a point where coagulation occurs.

It is known that latices containing polychloroprene or copolymers made from monomer mixtures which are preponderantly chloroprene undergo changes in properties upon storage even in the absence of air. Hydrogen chloride is formed from the polymer, reducing the pH of the latex, decreasing its stability toward mechanical and chemical influences, and finally causing coagulation. The problem of preventing this change or overcoming its effects is an old one in the technology of polychloroprene latices and before now has not been solved in a way that is generally satisfactory. Thus, increasing the original alkalinity of the latex retards coagulation, but this does not prevent a material change in its alkalinity during storage. Such latices do not give uniform results in the many manufacturing processes which depend on having a closely controlled pH and hence must have their pH adjusted to a varying extent before use. Inorganic salts having a buffer action cannot usually be used to counteract the liberation of acid because of the low tolerance of the latices toward electrolytes. None of these proposed solutions reach the heart of the problem by eliminating the formation of hydrochloric acid.

It is therefore an object of this invention to provide a simple and economical process for removing the labile chlorine from polychloroprene latex and thereby produce a stabilized polychloroprene latex which does not coagulate over long periods of storage.

This invention is based upon the discovery that a very small proportion of the chlorine in polychloroprene and in copolymers of chloroprene with minor amounts of other polymerizable compounds is readily removable, as hydrogen chloride, by hydrolysis or dehydrohalogenation and that the remaining chlorine is firmly bound. Consequently, the polymer after treatment according to the present invention is of greatly improved stability but on the other hand differs little in chemical composition and physical properties, except stability, from the original polymer. This readily removable chlorine is removed by heating the latex at temperatures of from 90° to 170° C. under quite strongly alkaline conditions and preferably in the absence of any material quantity of oxygen.

It was highly unexpected that polychloroprene latices could be heated for considerable periods of time at the temperatures hereinafter given without coagulation, for 100° C. was usually considered the maximum temperature that could be used even for the short time necessary for the preparation of latices (see U. S. Patent 2,426,854 to Bare), and therefore heating alone would be expected to cause coagulation.

While the removal of larger amounts (5%) of chlorine from polychloroprene by drastic treatment of the polymer in nitrobenzene solution with amines has been described by Salomon and Konigsberger [Recueil des Travaux Chimiques des Pays Bas 69, 711 (1950)], this process, which was developed as an analytical method for distinguishing various chlorine-containing polymers, leads to a product radically different from polychloroprene, and would lead to the belief that the hydrogen chloride from the relatively large proportions of labile chlorine which they show to be present would soon neutralize the caustic present and coagulate the latex.

The time required for removing the readily removable chlorine varies, of course, with the temperature. It is substantially all removed in 12 hours at 90° C., in 18 minutes at 140° C., or in 1.5 minutes at 170° C. Longer heating in each case, such as for another period of the same length, has little further effect upon the polymer and removes only a very small additional amount of hydrogen chloride. Longer periods of heating, however, may be used to make certain that substantially no amount of the labile chlorine has been left unattacked through errors in operation.

The amount of alkali added to the latex should be at least enough to react with all the removable hydrogen chloride and to give a final latex of the desired pH, usually about 12. Since the latex is originally maintained fairly alkaline, that is, at a pH of 11.5 to 12.5, the additional alkali required is usually equivalent to the hydrogen chloride to be removed from the polymer. Moderate excesses of alkali up to 1.5 times that required to combine with the hydrogen chloride do no harm. The amount used should not raise the pH above about 12.8. Any strong base may be used. Potassium hydroxide is somewhat preferred over sodium hydroxide because of the lesser effect of potassium ions on latex stability, although all latices made by the present invention have materially improved stability. Strong quaternary nitrogen bases, such as tetramethyl ammonium hydroxide, may also be used.

The present invention may be applied to any negatively charged latex in which the elastomer is a polymer of chloroprene or a copolymer of chloroprene in which chloroprene is the preponderating component and the minor polymerizable component does not contain readily hydrolyzable groups. The surface active agent used to emulsify the monomer before the polymerization step in the manufacture of the latex and to keep the polymer dispersed may therefore be of any type which is stable and effective in alkaline solution, such as water-soluble salts of long-chain fatty acids, of resin acids, or of long chain alkyl sulfates and sulfonates. The preferred solids content of the latex is between 30% and 40%, and should not be over 50%. Latex of lower solids content of course may be employed, but due to larger volumes these increase the cost of carrying out the process.

Throughout this specification the term "latex solids" refers to the total non-volatile solids contained in the latex.

This process is preferably carried out in the absence of oxygen, for in the presence of any substantial amount of oxygen heating of the latex to the temperatures required causes excess oxidation of the polymer with liberation of HCl which is ordinarily not removed merely be heating with alkali.

It has been found that the total hydrogen chloride removed from the polymer, corresponding to the very labile chlorine originally present, amounts to between about 8 and about 20 milli-mols per 100 grams of latex solids. The average quantity of labile halogen present in various types of latex is given below:

| | Milli-mols per 100 grams of latex solids |
|---|---|
| Polymer latex of Examples 1 to 3 | 10 to 11 |
| Polymer latex (similar to examples) in which 0.1% of iodoform was used in place of sulfur as modifier | 9 |
| Polymer latex made from 90 parts of chloroprene and 10 parts of 2,3-dichlorobutadiene-1,3 with emulsifying system of Examples 1 to 3 | 8 |
| Polymer latex with the sodium salt of disproportionate rosin as the emulsifying agent, stopped when only 70% of the chloroprene was polymerized (remainder removed with steam) | 17 to 18 |

The stability of the heat-treated latices may be further increased by removal of part of the electrolyte formed, by dialysis or by creaming, according to U. S. Patent 2,405,724.

The following examples are given to illustrate the invention. The parts used are by weight.

*Example 1*

A polychloroprene latex, made by emulsifying chloroprene containing 0.25% of sulfur and 4% of rosin in an equal weight of water containing 1.06% of NaOH and completely polymerizing at 40° C. using 0.4% of $K_2S_2O_8$ and 0.25% of $K_3Fe(CN)_6$ as catalysts (all percentages based on chloroprene), was reduced from 49% total solids to 40% total solids by the addition of 1121 grams of a 0.24 N potassium hydroxide solution to 5000 grams of the latex. This quantity of alkali corresponds to 11 milli-mols of hydrogen chloride per 100 grams of latex solids. The original latex was freshly made and had not been exposed to air. It contained 2.4 milli-mols of water-soluble chloride. All the manipulations of this example were carried out under nitrogen.

The diluted latex was placed in a jacketed stainless steel autoclave under nitrogen pressure of 50 p. s. i. g. Agitation was begun and the charge was heated as rapidly as possible to 140° C. using 160 p. s. i. g. steam in the heating jacket. When the heating period at 140° C. had ended, cold water was substituted for steam in the autoclave jacket and the charge was cooled to room temperature. The heating period required 3 minutes 15 seconds to heat from 100° C. to 140° C., then held 17 minutes at 140° C., and finally cooled in 3 minutes 45 seconds from 140° C. to 100° C. After this treatment, the latex had a pH of 12.3 and contained 11 milli-mols of chloride per 100 grams of latex solids.

Samples of the original latex that were not heat treated, and samples of the treated latex, after removal from the autoclave were subjected to an accelerated aging test by storing them under nitrogen at 50° C. After 40 days' storage the pH of the original latex (not heat treated) declined from 12.3 to 9.7 and the polymer in the latex evolved .008 mol of HCl per 100 g. of total solids (calculated from the chloride content of the latex before and after aging). The heat treated latex during the same period declined in pH only from 12.3 to 12.2 and the polymer evolved only an additional .002 mol of HCl per 100 g. of total solids. After 81 days' storage, the untreated latex had coagulated. The heat treated latex had a pH of 11.4 and had evolved a total of only 0.005 mol of HCl.

*Example 2*

Three (3) gallons of polychloroprene latex made as in Example 1, of very nearly 50% total solids content, was diluted with 2 gallons of distilled water in which had been dissolved 85 g. of potassium hydroxide (100%), which represents approximately 24 milli-mols of base per 100 g. of latex solids.

The diluted latex was passed through a corrosion resistant metal tube under 120 p. s. i. g. pressure. One portion of the tube was heated to 170° C. with steam and a succeeding portion of the tube was cooled by running water (25° C. to 30° C.). The rate of flow was so adjusted that the latex was exposed to a temperature of 170° C. for 150 seconds (±10 seconds) and then quickly cooled back to room temperature. Analysis of the treated latex showed that it had been carried to the same essential point in terms of HCl evolved by the polymer as was reached during the treatment described in Example 1.

*Example 3*

Example 1 was repeated at 90° C. After the first 6 hours of heating about 9 milli-mols of chloride had been liberated per 100 grams of latex solids. At the end of 12 hours, a total of only 11 milli-mols were liberated, and after 24 hours a total of only 12 milli-mols. It therefore appears that substantially all of the labile HCl is removed in 12 hours when heating to only a temperature of 90° C.

Accelerated storage tests indicate that these latices may be stored for at least three years at room temperature without coagulation.

I claim:

1. A process for removing labile chlorine from the polychloroprene in polychloroprene latices having a pH of at least 11.5, which comprises heating the latex at from 90° to 170° C., in the absence of oxygen, with sufficient excess of a strong base of the class consisting of inorganic bases and quaternary nitrogen bases to combine with the readily removable hydrogen chloride in the polymer, the heating being carried out for from about 1.5 minutes at 170° C. to about 12 hours at 90° C. so that substantially all of the labile chlorine is removed.

2. A process for removing labile chlorine from the polychloroprene in polychloroprene latices having a pH of at least 11.5, which comprises heating the latex at from 90° to 170° C., in the absence of oxygen, with sufficient potassium hydroxide to combine with the readily removable hydrogen chloride in the polymer while still maintaining a pH in the solution of not above 12.8, heating being carried out for from about 1.5 minutes at 170° C. to about 12 hours at 90° C. so that substantially all of the labile chlorine is removed.

3. A process for removing labile chlorine from the polychloroprene in polychloroprene latices having a pH of from 11.5 to 12.5, which comprises heating the latex at from 90° to 170° C., in the absence of oxygen, with from 1 to 1.5 times the amount of potassium hydroxide required to combine with the readily removable hydrogen chloride in the polymer, the heating being carried out for from about 1.5 minutes at 170° C. to about 12 hours at 90° C. so that substantially all of the labile chlorine is removed.

4. A polychloroprene latex having a pH of from 11.5 to 12.5 prepared by the process of claim 1.

References Cited in the file of this patent

UNITED STATES PATENTS 2,456,069   Livingston _____ Dec. 14, 1948

OTHER REFERENCES

"Neoprene Latex Type 735," Report No. 51–1, Rubber Chemicals Div., E. I. du Pont de Nemours & Co., Wilmington, Delaware, January 1951, page 6.